Figure 2:
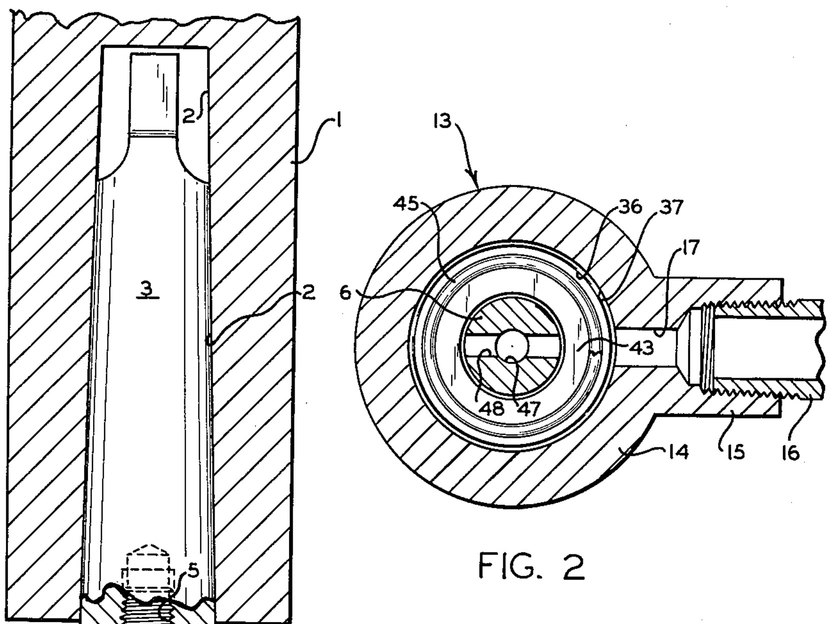

March 6, 1962 R. G. KOCH 3,024,030

COOLANT TRANSFER AND SEAL ASSEMBLY HAVING RELATIVELY ROTATING PARTS

Filed April 27, 1959

INVENTOR
ROLAND G. KOCH

BY Learman, Learman & McCulloch

ATTORNEYS

United States Patent Office 3,024,030
Patented Mar. 6, 1962

3,024,030

COOLANT TRANSFER AND SEAL ASSEMBLY HAVING RELATIVELY ROTATING PARTS

Roland G. Koch, Frankenmuth, Mich., assignor to Universal Engineering Company, Frankenmuth, Mich., a corporation of Michigan Filed Apr. 27, 1959, Ser. No. 809,243
10 Claims. (Cl. 279—20)

This invention relates to coolant transfer and seal apparatus for use in conjunction with rotary drilling or like apparatus of the kind particularly adapted for forming deep holes in metal or other material.

When drilling deep holes it is necessary to introduce cooling and lubricating fluid to the drill bit to cool the latter and to flush chips. It presently is possible to make use of extremely high speed drilling devices in forming such holes. When such high speed devices are used, fluid under considerable pressure must be introduced to the hole in order to provide sufficient circulation of fluid to cool and lubricate the drill and also to provide sufficient volume of fluid and at such pressure as to assure complete flushing away of the chips.

Drilling apparatus of the kind referred to may be of two types. With one type the drill is held stationary and the work piece revolved, whereas in the other the work piece is held stationary and the drill is rotated. When using apparatus of the kind wherein the drill is held stationary and the work piece is rotated, no particular problem is encountered in providing coolant fluid at sufficient pressure and volume to flush away the chips. In the other situation, however, fluid transfer means rotatable with the drill must be provided and this transfer apparatus must be supplied with coolant fluid from an external source. Owing to the high speed of rotation of a drill and the consequent high fluid pressure required with a drill of this kind, precision seals necessarily must be provided between the fixed and rotatable parts of the fluid transfer apparatus to prevent the loss of fluid and to maintain the desired pressure. Seals located between stationary and movable parts of fluid handling devices are subjected to forces which are proportional to the pressure of the fluid and the relative velocity of the movable parts. When the movable parts are rotatable, the velocity factor increases greatly in a direction radially away from the axis of rotation. Therefore, conventional seal constructions which are satisfactory for use in relatively slow speed drills are not at all suitable for use in drills requiring high speed rotation and high coolant pressures.

Some of the problems in effecting a suitable seal in high speed drilling devices of the kind referred to have been recognized heretofore and some constructions designed to overcome these problems have been proposed but none have to our knowledge been altogether satisfactory. One of the principal difficulties with coolant transfer devices of the kind proposed heretofore has been excessive wear of the sealing members. The permissible speed of rotation of the drill and pressure of the fluid have been held by the design of units previously proposed within working limits which I regard as undesirably low. The velocity of relative rotation and the pressure force of the fluid which cumulatively determine whether the seal will retain the coolant fluid for any appreciable length of time hereinafter will be referred to as the PV factor.

One of the principal objects of this invention is to provide coolant fluid transfer apparatus for high speed drilling devices or the like in which the PV factor is held to a minimum.

Another difficulty with known devices of the kind under consideration is the difficulty of balancing the coolant transfer device with the drill structure. A high speed drill having unbalanced forces acting thereon not only can be dangerous to the operator, but also hastens the wear of the apparatus and causes the parts to have a fairly short life.

Another object of the invention is to provide a high speed drill unit having balanced coolant fluid transfer means associated therewith.

Another object of the invention is to provide apparatus of the kind referred to which is economical to manufacture and easy to assemble.

Figure 1:
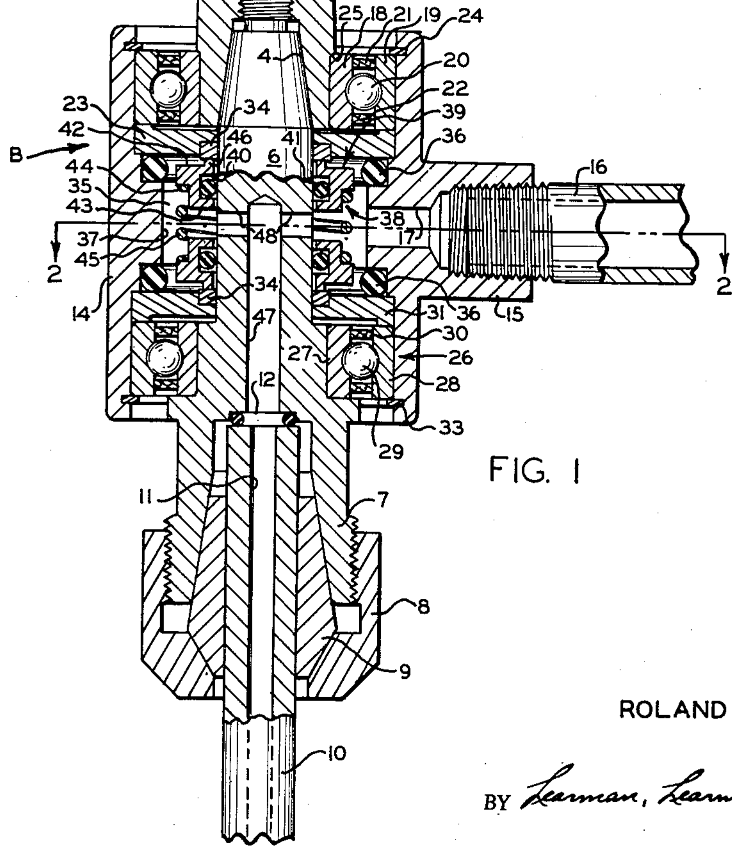

Other objects and advantages of the invention will be pointed out specifically or will become apparent from the following description when it is considered in conjunction with the appended claims and the accompanying drawings, in which:

FIGURE 1 is a vertical sectional view of apparatus constructed and assembled in accordance with the invention; and FIGURE 2 is a sectional view taken on the line 2—2 of FIGURE 1.

Apparatus constructed in accordance with the invention is adapted for use in conjunction with a high speed drill or boring machine including a rotatable arbor 1 having a tapering or other suitably formed opening 2 therein in which a correspondingly tapering shank 3 may be removably inserted. The external end of the shank 3 may be bored as at 4 and threaded as at 5 to receive one end of a correspondingly shaped spindle 6, the other end of the spindle having a jaw holding portion 7 and a nut 8 cooperable with jaws 9 to removably secure a drill bit 10 in axial alignment with the spindle 6. The particular means by which the drill bit 10 is connected to the spindle 6 and the particular means by which the spindle 6 is connected to the arbor 1 form no part of the invention per se and may be of any conventional kind.

The drill bit 10 preferably is provided with a longitudinally extending, axial bore 11 through which coolant fluid may pass from its internal end to its cutting end in the usual manner and an O-ring 12 or other suitable sealing member is interposed between the internal end of the drill 10 and the adjacent surface of the spindle 6.

Means for transferring coolant fluid from a suitable source (not shown) to the fluid passage 11 in the drill comprises a housing designated generally by the reference character 13 and including an annular, sleeve-like member 14 which surrounds the drill spindle 6 and is stationary with respect thereto. The annular member 14 is equipped with a laterally projecting fitting 15 in which is removably secured one end of a hose or pipe 16 leading to the source (not shown) of pressure fluid. The fitting 15 is equipped with a fluid passage 17 in communication with the bore of the pipe 16, and the passage 17 extends to the interior of the member 14.

At each end of the housing unit 13 is a bearing assembly by means of which the member 14 is fixed with respect to the spindle 6. The bearing assembly at one end of the housing comprises an inner race 18 fixed to the external end of the tool holder 3 and an outer race 19 fixed to the member 14. Between the races 18 and 19 is a plurality of ball bearings 20, and lubricant seals 21 and 22 are mounted between the races on opposite sides of the balls 20. The bearing 19 is seated against an annular metal ring 23 which is carried by the housing member 14, the bearing assembly being maintained in position by means of a snap ring 24 engaging the race 19 and a shoulder 25 formed on the holder 3 and engaging the race 18.

At the opposite end of the housing member 14 is a similar bearing structure 26 and comprising an inner race 27, an outer race 28, and ball bearings 29 located therebetween. Similar lubricant seals 30 are located on opposite sides of the ball bearings 29. The bearing assembly 26 is located between a metal, annular ring 31 similar to the ring 23 and is maintained in position by a snap ring 32 similar to the snap ring 24.

The pressure exerted by fluid in the housing is absorbed by the seal backing members 23 and 31 which are so constructed as to bear on the outer races 19 and 28. Consequently, fluid pressure does not exert end thrust on the bearings 20 and 29 and the only end thrust exerted on these parts is that imposed by the snap rings 24 and 33.

The annular rings 23 and 31 are provided at their inner peripheries with annular bearing members 34 formed of Teflon, graphitar, or similar material which journal the spindle 6 for rotation relatively to the rings 23 and 31 and which form parts of the fluid seal yet to be described. The members 34 may be glued to rings 23 and 31 with a suitable adhesive such as epoxy resin adhesive. The rings 23 and 31, together with their bearing rings 34, the side walls of the housing 13, and the spindle 6, form an annular fluid chamber 35 within the housing and which is in communication with the port 17 in the fitting 15. Suitable sealing members such as O-rings 36 are interposed between the respective inner plates 23 and 31 and an annular shoulder 37 formed on the inner periphery of the member 14, the seals 36 preventing leakage of the fluid from the chamber 35 around the outer periphery of the rings 23 and 31.

In order to prevent the leakage of coolant fluid between the spindles 6 and the bearings 34, sealing means 38 is provided. The sealing means comprises a pair of nitrided annular body members 39 which are identical, so only one need be described. Each annular body member has an outer diameter which is less than the diameter of the chamber 35 and has an inner diameter corresponding substantially to the diameter of the spindle 6 so as to be fitted concentrically on the latter. Each body member 39 includes an inner recess 40 in which is mounted an O-ring or similar seal element 41 which grips the spindle 6 so as to provide a seal at the inner periphery of the members 39 while at the same time permitting movement of the members 39 towards and away from one another axially of the spindle 6.

Each body member 39 has two opposed faces 42 and 43, the face 42 being located adjacent to the associated chamber forming member 23 or 31 and the other face 43 being located adjacent to, but spaced from, the corresponding face of the other member 39. Each member 39 is shouldered as at 44 to provide a seat for a compression spring 45 which surrounds the spindle 6 and bears against each of the members 39 to move them away from one another into engagement with the chamber forming members 23 and 31. The shoulders 44 are formed as axially spaced continuations of the faces 43, the significance of which will be pointed out hereinafter.

The face 42 of each seal member 39 which lies adjacent to its respective chamber forming member 23 and 31 is provided with an axially extending flange 46 at its inner periphery and which is of small diameter compared to the diameter of the member 39. The flanges 46 are in engagement with the adjacent seal elements 34 and are adapted to seat thereagainst in order to seal the chamber 35 from the spindle 6.

In the disclosed embodiment of the invention, the spindle 6 is provided with a bored, axial fluid passage 47 which is adapted to be aligned with the passage 11 in the drill bit 10. At its internal end, the passage 47 communicates with radial ports 48 which in turn communicate with the chamber 35 so as to receive fluid introduced into the chamber via the conduit 16 and the passage 17 and conduit it to the passages 47 and 11. In order to provide an unobstructed path for the fluid, the ports 48 are so located in the spindle 6 that they open in the region between the two seal members 39. The spring 45 is a fairly light spring and need have a capacity only great enough to maintain the seal elements 39 in engagement with rings 34, when the apparatus is not in use.

In the operation of the apparatus, the parts will be assembled as indicated in FIGURE 1, the drill bit 10 introduced to a pilot hole or the like formed in a work piece, and the motor means (not shown), for driving the arbor 1 will be started. Fluid under pressure will be pumped from the source to the chamber 35 via the conduit 16 and the port 17 and it is not uncommon for this fluid to be at a pressure in excess of 1000 pounds per square inch. The chamber 35 will fill with fluid under pressure so that continued delivery of fluid to the chamber will cause fluid to enter the passages 48, 47 and 11 for delivery to the cutting end of the drill to cool the latter and flush chips from the hole being formed.

When the chamber 35 is filled with pressure fluid, the fluid pressure acts on all parts in the chamber equally and in all directions. Thus, the pressure fluid acts on the seal body surfaces 42 and the surfaces of the shoulders 44 and the surfaces 43 with equal force, but in opposite directions. Due to the provision of the flanges 46, the surfaces 42 have less area exposed to the pressure fluid than the surfaces 43 and the shoulders 44, and this differential in areas results in a net force being exerted on the seal members 39 tending to force them away from one another so that the flanges 46 seat against the bearing elements 34 and maintain a seal therebetween.

As has been pointed out, the seal members 39 rotate with the shaft 6 at a speed on the order of 8000 r.p.m., whereas the seal elements 34 are stationary. Not all portions of the seal members 39 travel at the same peripheral velocity. That is, the radially outer parts of the members 39 move at a higher peripheral velocity than do the radially inner parts. Since the flanges 46 are located at the inner periphery of the elements 39, they rotate at a lower peripheral speed than any other more radially remote part of the members 39, so the peripheral speed of the flanges 46 is at a minimum.

The wear imposed on the seal elements 34 and 46 is directly proportional to the forces by which they are urged into engagement and to the relative velocity therebetween. As has been pointed out earlier, this factor which determines the effectiveness of the seal over a period of time may be referred to as the PV factor. In the disclosed embodiment of the invention, the forces by which the elements 39 are urged into engagement with the seal members 34 are due to the force of the spring 45 and the net fluid force attributable to the area differential between the opposed faces of each element 39. The force exerted by each spring 45 is, as has been stated, quite light, and the net force exerted by the pressure fluid also is held at a minimum in the sense that the area of that portion of each of the flanges 46 which is in engagement with its respective seal element 34 is no greater than believed necessary to provide a seal with a reasonable safety factor. In view of this and inasmuch as the relative speed of the elements 34 and their engaging flanges 46 is at a minimum due to the location of the flanges 46 at the inner periphery of the members 39, the PV factor of the sealing parts will be at a minimum for the particular speed and pressure used. Because of the design of the instant construction greater drill speeds and higher flushing pressures can be employed. With the flanges 46 effecting the seal being relatively thin, the parts 39 will thus dissipate friction heat to the coolant fluid readily, and also a minimum horsepower will be consumed in relatively rotating the seal parts.

In a preferred construction, the passage 47 in the spindle 6 will be located axially of the latter, as is indicated in FIGURES 1 and 2, and all ports communicating therewith and with the chamber 35 will be radial. Thus, the fluid passages in the spindle may be formed quite simply and will enable the spindle 6 to be balanced with minimum difficulty.

The disclosed embodiment is representative of a presently preferred form of the invention, but is intended to be illustrative rather than definitive thereof. The invention can be utilized in machine spindles of all kinds including boring machines or the like and is not limited to use only in those machines having a shank or chuck jaws as shown. It is to be understood that the drawings and descriptive matter are in all cases to be interpreted as merely illustrative of the principles of the invention rather than as limiting the same in any way since it is contemplated that various changes may be made in the various elements to achieve like results without departing from the spirit of the invention or the scope of the appended claims.

What is claimed is:

1. Coolant fluid transfer apparatus for use with rotatable drilling apparatus or the like having a rotatable spindle, said apparatus comprising a stationary housing surrounding said spindle, said housing having means forming with said spindle a fluid chamber; bearing means between said spindle and housing; fluid delivery means communicating with said chamber for supplying fluid thereto; sealing means axially inward of the bearing means mounted within the confines of said housing on said spindle for rotation therewith; said sealing means comprising an annular body having an inner diameter corresponding substantially to the diameter of said spindle and having opposed faces spaced axially of said chamber, said body including an inner peripheral flange on one face of said body of less width than the width of said body and in sealing engagement with a chamber defining wall of said chamber forming means, the arrangement being such that the other face of said body has a greater surface area exposed to fluid in said chamber than said one face; and fluid passage means formed in said spindle and in communication with said chamber for conducting fluid therefrom.

2. The apparatus set forth in claim 1 wherein said body is shiftable axially of said spindle and wherein the surface area differential of said faces of said body is such that fluid in said chamber exerts a net force on said body to shift it axially of said spindle in a direction to hold said flange against said chamber forming means.

3. The apparatus set forth in claim 1 wherein said fluid passage means comprises an axial passage in said spindle and radial ports in said spindle in axial alignment with said fluid delivery means leading from said chamber to said passage.

4. The apparatus set forth in claim 1 wherein said body has a circumferential groove in its inner periphery and wherein a seal element is located within said groove in snug engagement with said spindle and with said body.

5. Coolant fluid transfer apparatus for use with rotatable drilling or like devices having rotatable spindle means, said apparatus comprising a stationary housing surrounding said spindle means, said housing having means therein forming with said spindle means a fluid chamber; bearings between said spindle means and housing at the ends of said housing; means communicating with said chamber for supplying fluid under pressure thereto; annular sealing means axially inwardly of said bearing means in said housing mounted on said spindle means for rotation therewith, said sealing means comprising a pair of spaced annular members each having an inner diameter corresponding substantially to the diameter of said spindle and each having opposed faces spaced axially of said chamber, each of said bodies including an inner peripheral flange projecting axially from one face of each member at said spindle adapted for engagement with said chamber forming means, the arrangement of said sealing members being such that the other face of each has a greater surface area exposed to fluid in said chamber than said one face; and fluid passage means formed in said spindle means intermediate said sealing members and in communication with said chamber for conducting fluid therefrom.

6. The construction set forth in claim 5 wherein each of said annular members is shiftable axially along said spindle means and wherein the surface area differential of said faces of said members is such that fluid in said chamber exerts a net force on said members tending to increase the spacing therebetween to hold said flanges against said chamber forming means.

7. The apparatus set forth in claim 5 including spring means reacting against said annular members urging them away from one another.

8. The apparatus set forth in claim 7 wherein said spring means surrounds said spindle means.

9. The combination set forth in claim 5 wherein said bearings comprise ball bearing races mounted between the spindle means and housing at the ends of said housing and said spindle means is reduced in diameter between said races.

10. Coolant fluid transfer apparatus for use with rotatable drills and the like comprising; a rotating arbor; spindle means of reduced diameter relative to said arbor received axially thereby and projecting axially therefrom; chuck means on the projecting end of said spindle means at a spaced distance from said arbor for holding a drill with an axial passage; said spindle means having a portion of reduced diameter between said chuck means and arbor; a stationary housing surrounding said portion of reduced diameter with an outer peripheral wall spaced radially therefrom to define a fluid chamber therebetween; axially spaced apart ball bearing means between said spindle means and the peripheral wall at the ends of said housing, said bearing means at each end including balls mounted between an inner race and an outer race; snap rings carried by said peripheral wall at each end bearing only on the outer races; a ring member, stationary with said housing and axially inwardly of and adjacent each bearing means, surrounding said spindle means portion and extending radially from said spindle means portion to said peripheral wall to define an end wall of said chamber, each ring member having an axial shoulder at its outer periphery bearing only on the outer race of each bearing means and a recess at its inner periphery in the opposite face of the ring member; a seal bearing member of a non-metallic, hard wearing material within each said recess; a pair of spaced annular seal members, each having opposed end faces and each having an inner diameter slightly greater than said portion of the spindle means, mounted thereon within said chamber in axially spaced relation to rotate with said spindle means, each annular member having an outer diameter spaced from said peripheral wall of the housing and an axially extending flange adjacent said spindle means in sealing engagement with one of said seal bearing members; the other end face of each annular member being, because of the projecting flange, less in area than its opposite face so that fluid under pressure in said chamber maintains said flanges in sealed engagement with said seal baering members; a radial passage in said spindle means leading to said axial passage in said drill from between said annular members; and a fluid delivery passage for said housing leading to said chamber.

References Cited in the file of this patent

UNITED STATES PATENTS

| | | |
|---|---|---|
| 2,777,702 | Rodal | Jan. 15, 1957 |
| 2,933,321 | Cascone | Apr. 19, 1960 |
| 2,937,029 | Colby | May 17, 1960 |
| 2,985,468 | Shaw | May 23, 1961 |